United States Patent

[11] 3,592,977

[72] Inventor James U. Lemke
Del Mar, Calif.

[21] Appl. No. 863,260
[22] Filed Oct. 2, 1969
Division of Ser. No. 649,540, June 28, 1968, Pat. No. 3,541,577.
[45] Patented July 13, 1971
[73] Assignee Bell & Howell Company
Chicago, Ill.

[54] MIRROR-IMAGE MAGNETIC INFORMATION RECORDING METHODS PARTICULARLY FOR VIDEO SIGNALS
5 Claims, 12 Drawing Figs.

[52] U.S. Cl. ........ 179/100.2E
[51] Int. Cl. ........ G11b 5/86
[50] Field of Search ........ 179/100.2 E, 100.2 T

[56] References Cited

UNITED STATES PATENTS 2,773,120 12/1956 Masterson ........ 179/100.2

OTHER REFERENCES

"Duplicating Magnetic Tape By Contact Printing" CAMERAS, ELECTRONICS, Dec. 1949, PP 78—81

*Primary Examiner*—James W. Moffitt
*Assistant Examiner*—Robert S. Tupper
*Attorney*—Luc P. Benoit

ABSTRACT: A method of producing a slant-track or transverse-scan master record on a master recording tape for subsequent copying onto a copy tape by a tape-to-tape copying process. The master tape is advanced, and at least one recording head is moved relatively to the advancing master tape along first recording tracks which extend on the master recording tape, with respect to longitudinal edges thereof, at angles which are mirror images of angles or corresponding second recording tracks required on the copy tape under a predetermined convention for playback of the information from the copy tape. Information is recorded in the mentioned first recording tracks by the one or more recording heads during their movement along the first recording tracks.

INVENTOR

JAMES U. LEMKE

INVENTOR
JAMES U. LEMKE

INVENTOR

JAMES U LEMKE

MIRROR-IMAGE MAGNETIC INFORMATION RECORDING METHODS PARTICULARLY FOR VIDEO SIGNALS

CROSS-REFERENCE TO A RELATED APPLICATION

This is a Division of U.S. Pat. application Ser. No. 649,540, (now U.S. Pat. No. 3,541,577, issued Nov. 17, 1970) Method of Curie Point Recording, filed June 28, 1967, by James U. Lemke, and assigned to the assignee of the subject Division.

BACKGROUND OF THE INVENTION

1. Field of the Invention

The subject invention relates to the art of information recording and, more particularly, to the magnetic recording of information and copying of magnetically recorded information.

2. Description of the Prior Art

In recent years the art of magnetic tape recording by means of magnetic recording heads has been developed and refined to the point where near perfection has been achieved for many purposes. This stands in sharp contrast to the deficiencies which still exist in related areas, such as those concerned with the copying of magnetically recorded information from one medium to another.

Particularly the latter area is of increasing importance as more and more information, such as data, literature, music and televisio^n programs, is recorded on magnetic tape and is required to be efficiently duplicated on further magnetic tapes.

SUMMARY OF THE INVENTION

The present invention provides improved methods for the provision of superior copies of magnetic information records.

From one aspect thereof, the invention resides in a method of producing, for subsequent copying onto a copy tape by a tape-to-tape copying process, a slant-track or transverse-scan master record of information on a master recording tape having parallel longitudinal edges, by the use of recording means adapted to be operatively coupled with the master recording tape for recording the information thereon. According to this aspect of the subject invention, the recording means are moved relatively to the advancing master recording tape along first recording tracks extending on the master recording tape with respect to the mentioned longitudinal edges at angles which are mirror images of angles of corresponding second recording tracks required on the copy tape under a predetermined convention for a playback of the information from the copy tape. The information is recorded with the recording means in the first recording tracks during the movement of the recording means along the first recording tracks.

In a preferred embodiment of the invention, the movement of the recording means relative to the master recording tape includes moving the recording means substantially in a predetermined plane, and transporting the master recording tape at an angle which, as seen from a predetermined reference point, is a mirror image of an angle required under a predetermined convention for a playback of said information from the copy tape.

From another aspect thereof, the invention resides in a method of recording information on a master recording tape, producing on a copy tape a copy of the information, and playing back the copied information from the copy tape. According to this aspect of the subject invention, information recording means and the master recording tape are relatively moved along first recording tracks extending on the master recording tape at predetermined first angles to a direction of movement of the master recording tape, and the information is recorded with the recording means in the first recording tracks during the relative movement of the information recording means and the master recording tape. A tape-to-tape copying process is employed to produce on the copy tape a copy of the recorded information in the form of an information record contained in second recording tracks extending at second angles which are mirror images of the mentioned first angles. Further according to the aspect of the invention under discussion, information playback means and the copy tape are relatively moved along the second recording tracks and the information is played back with the information playback means from the mentioned copy on the copy tape during the relative movement of the information playback means and the copy tape.

From yet another aspect thereof, the invention resides in a method of master recording information on a recording tape having a first top surface and first parallel longitudinal edges, producing on a copy tape having a second top surface and second parallel longitudinal edges a copy of said information, and playing back said copied information from said copy tape. This method comprises, in combination, the improvement of relatively moving information recording means and the master recording tape along first recording tracks individually extending on the master recording tape, as seen from the mentioned first top surface, from at least the vicinity of one of said first longitudinal edges to at least the vicinity of the other of said first longitudinal edges, and at predetermined first angles relative to the first longitudinal edges, and recording with the information recording means the information in the first recording tracks during the relative movement of the information recording means and the master recording tape, producing on the copy tape, by a tape-to-tape copying process, a copy of the recorded information in the form of an information record contained in second recording tracks individually extending, as seen from said second top surface, from at least the vicinity of the other of said second longitudinal edges corresponding to said one of said first longitudinal edges, to at least the vicinity of the other of said second longitudinal edges corresponding to said other of said first longitudinal edges, and at second angles which are mirror images of said first angles, and relatively moving information playback means and the copy tape along the mentioned second recording tracks and playing back with the information playback means the information from the copy on the copy tape during the relative movement of the information playback means and the copy tape.

From a still further aspect thereof, the subject invention resides in a method of recording information on a master recording tape with the aid of recording head means, producing on a copy tape a copy of the recorded information, and playing back the copy of the recorded information from the copy tape with the aid of playback head means. The latter method according to the subject invention comprises, in combination the improvement of rotating the recording head means in a predetermined plane, transporting the master recording tape by way of that predetermined plane at a first angle relative to that plane and recording the information in a slant-track pattern on the master recording tape with the recording head means, producing on the copy tape and with a one-step tape-to-tape copying process a mirror-image copy of said slant-track pattern including a copy of the information, rotating the playback head means in a predetermined plane, and transporting the copy tape by way of said plane of rotation of the playback head means at a second angle relative to the plane of rotation of the playback head means, with the first and second angles being mirror images of each other, and playing back, with the playback means, said copy of the information from said mirror-image copy of the slant-track pattern on the copy tape.

BRIEF DESCRIPTION OF THE DRAWINGS

The subject invention and its various aspects will be more readily apparent from the following detailed description, illustrated by way of example in the accompanying drawings in which.

DESCRIPTION OF THE PREFERRED EMBODIMENT

Figure 1:
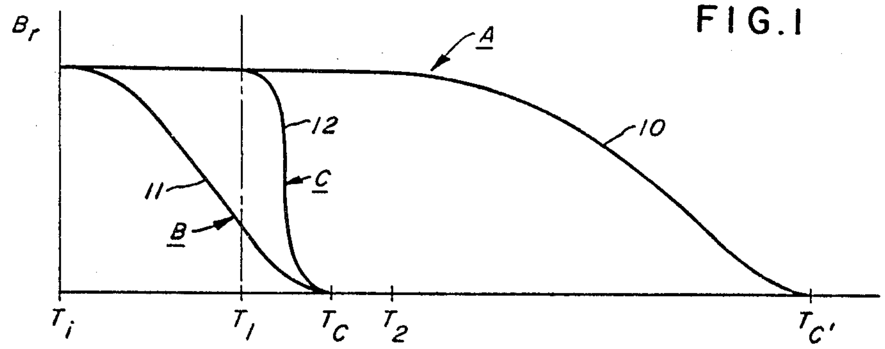
FIG. 1 is a qualitative graph of remanent magnetization characteristics as a function of temperature.

The qualitative graph of FIG. 1 illustrates by means of curves 10, 11 and 12 the remanence of three magnetic recording media A, B and C as a function of temperature T. For explanatory purposes the media A, B and C are represented as being heated from an initial temperature $T_i$.

The medium A is representative of magnetic recording materials, such as gamma ferric oxide, which display a gradually sloping remanence characteristic that occupies a large temperature range below the Curie point $T_C'$. It is easy to see from the curve 10 that it is practically impossible to heat selected portions of the medium A above the Curie point $T_C'$ without increasing at the same time the temperature of adjacent regions of the medium to values which entail a reduction in the remanence of those regions. For instance, heat will flow from the selected portions to adjacent regions or, if this is to be avoided by a very brief application of the information-modulated heat energy, it will be necessary to preheat the medium to a temperature in the vicinity of the Curie point $T_C'$.

The medium B is representative of materials, such as chromium dioxide, which have a comparatively low Curie point $T_c$as is well known in the art. A low Curie point is favorable in many applications in which factors such as the constitution of the medium prohibits the use of high temperatures or in which the feasible temperature of the available heat energy is itself limited. However, the problems just outlined with respect to the medium A are not avoided by the sue of the medium B if that medium has a relatively gradually sloping remanence characteristic as shown by the curve 11.

The remanence curve 12 of the medium C illustrates the result of a systematic approach to these problems. In accordance with one of the above-mentioned basic steps of the invention, disclosed in the parent application the magnetizable medium C is characterized by magnetic particles which have a predetermined quality of anisotropy that satisfies several conditions. First, the predetermined quality of anisotropy imparts upon the particles a substantially stable remanence within a first temperature range, which is illustrated in FIG. 1 by the range extending from $T_i$ to $T_1$. Secondly, this predetermined quality of anisotropy imparts upon the particles a rapidly declining remanence within a second temperature range, which is illustrated in FIG. 1 by the range extending from $T_1$ to $T_C$.

The two conditions just mentioned are apparent in FIG. 1 from the stable portion of the curve 12 between $T_i$ and $T_1$ and the acutely sloping portion of the curve 12 between $T_1$ and $T_C$.

Thirdly, the predetermined quality of anisotropy of the magnetic particles is made to dominate other qualities of these particles which tend to cause remanence diminutions within the mentioned first temperature range in derogation of the recited stable remanence.

Pursuant to a preferred method according to the invention, disclosed in the parent application, the geometric aspect ratio of the particles or at least the dominant portion of the particles of the medium C is dimensioned so that the particles' shape anisotropy dominates their crystal anisotropy. In this manner, a remanence characteristic of the type illustrated by curve 12 in FIG. 1 is realized, since crystal anisotropy promotes temperature-dependent coercivity losses well below the particles' curie point, while shape anisotropy sustains a substantially stable coercivity or remanence into the vicinity of the particular Curie point. As a further feature, this leads to a relatively acute decline of the remanence curve within a comparatively narrow temperature range close to the Curie point.

These features produce results that are highly significant in the area under consideration. For instance, it is easily seen from the curve 12 of FIG. 1 that the application of information-controlled heat differentials to media of the type C is conveniently and efficiently effected within a relatively narrow temperature range. At the same time, regions of the medium can be heated up to the neighborhood of the critical temperature $T_1$ without being subjected to the ferromagnetic phenomena that take effect within the temperature range $T_1$ to $T_C$, or $T_1$ to $T_2$, whereby $T_2$ is a temperature beyond the Curie point $T_C$.

The combination of these features leads to high-quality magnetic information records, since very pronounced ferromagnetic effects can be accomplished with limited amounts of heat energy within a narrow temperature range, and since the magnetic state of regions which are not to be subjected to these effects is not materially adversely affected by the heating of selected areas above the temperature $T_1$. The latter advantage is due to two reasons. First, the remanence curve is substantially stable up to $T_1$, despite of the sharp decline beyond that temperature. Secondly, if relatively small energies are sufficient to accomplish the desired ferromagnetic effects beyond $T_1$, the danger that heat energy may flow to the regions of the medium that are not to be heated beyond $T_1$ is correspondingly lessened until it becomes practically insignificant.

In accordance with the above-mentioned second basic step of the invention, disclosed in the parent application, information-controlled thermal remanent magnetization is employed in order to record information on the magnetic medium. The significance of this step is illustrated in FIG. 2 which plots remanent magnetization $B_r$ against applied magnetic field strength H.

Figure 2:
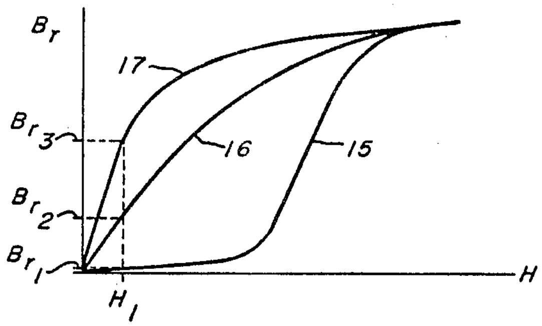
FIG. 2 is a qualitative graph illustrating remanent magnetization characteristics under different magnetization conditions.

In FIG. 2, the curve 15 illustrates the well-known direct-current remanent magnetization, while the curve 16 relates to anhystertic remanent magnetization, which is equally well known from its beneficial effect in magnetic tape recording. The curve 17 on the other hand is obtained by thermal remanent magnetization which is characterized by a heating of the magnetic recording medium, here medium C, FIG. 1, beyond the temperature $T_1$ and by the application of a magnetic field or fields while the recording medium is cooled or is permitted to cool down from an elevated temperature above $T_1$. The presence of the magnetizing field or fields during cooling is an essential feature of the presently discussed method step according to the invention.

In principle, thermal remanence magnetization effects occur even if the temperature of the medium C is driven to a point which, while being located above $T_1$, is situated below the Curie point $T_C$. However the strongest thermal remanent magnetization effect is obtained if the temperature of the particles to be subjected thereto is driven to the Curie point $T_C$, or even somewhat beyond $T_C$. This is very important as far as factors such as high signal-to-noise ratio or qualitative and quantitative acuity of the recording are concerned. A strong remanent magnetization effect not only imparts intensity to the recorded signal, but permits the use of magnetic fields which are too weak to magnetize to an objectionable degree portions of the medium located beside the signal recordings, and which are generally much weaker than corresponding magnetizing fields applied by the prior art.

This is seen from FIG. 2, where a field strength H applied for thermal remanent magnetization has been qualitatively indicated. This field strength leads only to a small remanent magnetization $B_{r1}$ as to portions of the medium which are not heated above $C_1$. On the other hand, a strong remanent magnetization $B_{r3}$ results as to those regions which are subjected to thermal remanent magnetization which includes a cooling of these regions from $T_c$ or above $T_c$ down to below $T_1$ while these regions are subjected to a magnetic field of the strength $H_1$. This remanent magnetization $B_{r3}$ is even stronger than the remanent magnetization $B_{r2}$ obtained by the mentioned anhysteretic method which is considered invaluable in the magnetic tape recording art.

As an added advantage, the linearity of the resulting recording is at a maximum when the thermal remanent magnetization step just described is employed inasmuch as the remanent magnetization illustrated by the curve 17 has a long initial linear region.

In practice, closely similar effects may be produced even if the affected particles are not heated exactly to the Curie point $T_C$. However, in accordance with the teachings of the invention disclosed in the parent application it is even in such cases necessary to heat the particles at least up to the temperature region where the curve 12 of FIG. 1 experiences its lowermost bend direcuy adjacent $T_C$. It is for present purposes considered that this narrow region is included in the general designation "Curie point."

Figure 3:
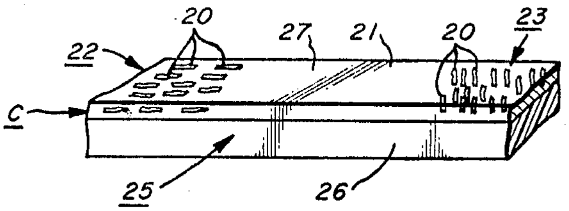
FIG. 3 is a perspective sectional view of a recording medium employed according to the invention disclosed in the above-mentioned Parent application Ser. No. 649,540.

As to physical organization, FIG. 3 shows that the magnetic particles 20 which characterize the recording medium C may, for example, be oriented in parallel to the recording surface 21 as shown at 22, or at right angles to that surface 21 as illustrated at 23. While a longitudinal orientation has been shown at 22, a transverse orientation may be employed instead. As is well known, a transverse orientation is preferable if information is recorded in slant or transverse tracks, as is generally done in modern video tape recorders.

In both cases, the particles 20, as to the dominant majority thereof, extend parallel to each other. The orientation 22 is generally preferred for information recording or copying processes in which the required heat energy is applied through the surface 21. The orientation 23, on the other hand, has significant advantages if the required heat energy is driven through the recording medium before being made to impinge on an information record that will establish the information-indicative heat gradients. In the latter case, the vertical orientation 23 increases the transparency of the medium to electromagnetic radiations, such as heat or light.

In FIG. 3, the medium C is shown as being implemented in a magnetic recording tape 25 which includes a carrier tape 26 that may be of a heat-stable material, such as Mylar, and a coating 27 in which the magnetic particles 20 are embedded. Suitable coating materials and processes for embedding the particles are already known, as are suitable magnetic materials for the particles 20. For present purposes, chromium dioxide particles are preferred for their relatively low Curie point and their susceptibility to being prepared in needle-shaped or acicular form.

In accordance with a further important feature of the invention disclosed in the parent application, the desired thermal remanent magnetization may be effected by the use of an information-indicative magnetic field, as distinguished from information-indicative heat gradients. For example, the medium may be heated uniformly, while information-indicative magnetic field gradients are applied during the thermal remanent magnetization.

Figure 4:
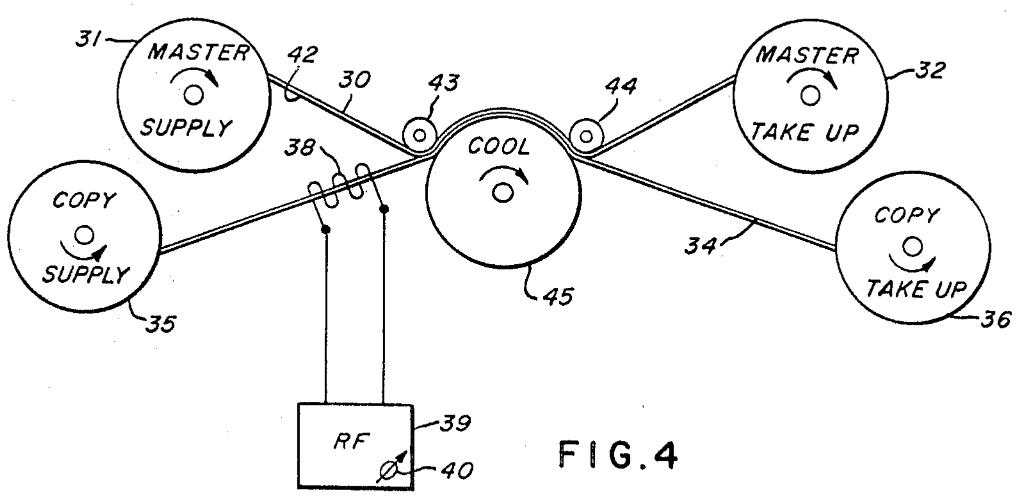
FIG. 4 is a schematic side view of a tape copying apparatus implementing a preferred embodiment of the invention disclosed in the above-mentioned Parent application.

An embodiment of this mode of magnetization is illustrated in FIG. 4. According to this figure, a first magnetic recording tape 30 is transported from a supply reel 31 to a takeup reel 32. Similarly, a magnetic recording tape 34 is transported from a supply reel 35 to a takeup reel 36. The tape 30 may be called "master tape" and has information magnetically recorded thereon. This may be done in a conventional manner, such as by means of a magnetic recording head in a magnetic tape recorder (not shown).

The master tape 30 may have a conventional recording medium, such as one comprised of gamma ferric oxide particles which, as shown in FIG. 1, have a Curie point $T_C'$ which is above the Curie point $T_C$.

The recording tape 34 may be called the "copy tape." The tape illustrated in FIG. 3 may be used for this purpose. It will be recalled that this type of recording medium has a lower Curie point $T_C$ than the more conventional magnetic recording media and is characterized by a substantially stable remanence up to $T_1$ and a subsequently sharply declining remanence between $T_1$ and $T_C$ (see curve 12, FIG. 1).

After leaving the supply reel 35, the copy tape 34 is drawn through an electromagnetic coil 38 which is energized by a source of radiofrequency energy 39 regulated at 40. While other sources of heat energy, such as infrared sources or heated rollers may be employed, the use of radiofrequency heating is preferred, since experiments have confirmed that this evokes heat in the magnetic particles directly, as the tape itself and the binder in the coating are good dielectrics thus minimizing the required heat input and possible heat damages to the tape and coating.

Radiofrequency sources for heating purposes are well known as such.

After the copy tape 34 has been heated, it is brought into contact with the master tape 30. For best results as to signal intensity and signal-to-noise ratio, the master and copy tapes are arranged such that the recording surface 21 (see FIG. 3) of the copy tape 34 contacts the recording surface 42 of the master tape 30.

Cooperating rollers 43, 44 and 45 assure an intimate mutual contact of the tapes 30 and 34 and help to prevent mutual slippage between such tapes. The rollers 43 and 44 are idling rollers, while the roller 45 serves the purpose of cooling the particles 20 by drawing heat from the tape 34.

The applied radiofrequency energy is adjusted at 40 so that the magnetizable particles of the copy tape 34 are heated to a temperature at least as high as their Curie point $T_C$. In practice, heat losses are taken into account by heating the particles to a temperature above $T_C$, such as the temperature $T_2$ indicated in FIG. 1. For example, the temperature interval between $T_C$ and $T_2$ may be correlated to the heat losses encountered between the heating step and the thermal remanent magnetization step presently to be described.

The cooling roller 45 draws sufficient heat from the tapes so that the particles 20 of the copy tape 34 are cooled to a temperature in the stable remance range (see FIG. 1). For instance, these particles are cooled to a temperature below $T_1$ shown in FIG. 1 while the master and copy tapes are in mutual contact on the roller 45.

In this fashion, the cooling of the particles 20 of the copy tape 34, from $T_2$ down to below $T_1$ takes place while the copy tape is in contact with the master tape and is thus exposed to the magnetic field gradients of the information recorded on the master tape 30.

In this manner, the information recorded on the master tape 30 is copied on the copy tape 34 in that a magnetic image of the master record appears on the latter tape.

Owing to this thermal remanent magnetization, the copied information is characterized by high signal strength and very little loss in signal-to-noise ratio. Also, the cooling step can be effected quickly and efficiently, as the temperature range between $T_1$ and $T_2$ is relatively narrow because of the high acuity of the remanence curve 12 between $T_1$ and $T_C$. If desired, the speed of the copying process may be further increased by drawing heat from the roller 45. This may be done by implementing into that roller a conduit (not shown) that is supplied with a coolant through rotatable fluid couplings (not shown).

After the copying process has been completed, the tapes 30 and 34 are wound on the separate takeup reels 32 and 36, respectively. If desired, several copies of the master record may be established in one run by bringing the master tape 30 into successive contact with further copy tapes and by repeating the steps described above with respect to the copy tape 34.

Figure 5:
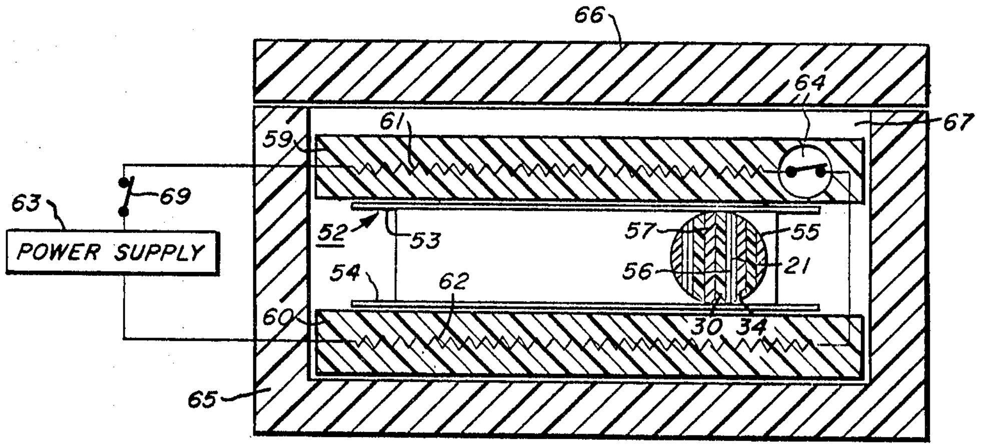
FIG. 5 is a longitudinal section of a further tape copying apparatus implementing a preferred embodiment of the invention disclosed in the above-mentioned Parent application.

An alternative copying method and apparatus is shown in FIG. 5. Therein, the master and copy tapes 30 and 34 are jointly coiled on a reel 52 which has flanges 53 and 54. As shown in the magnified cross-sectional outline 55, the tapes 30 and 34 are jointly coiled so that the recording surface 21 of the copy tape 34 contacts the recording surface 56 of the master tape 30. To prevent crosstalk or objectionable copying between different turns of the jointly coiled tapes, a spacer tape 57 may be cowound with the tapes 30 and 34. To promote heat dispersion, the spacer tape 57 may be metallic or strongly metallized. Alternatively, the spacer tape 57 may be of the same or of a similar material as the tapes 30 and 34.

In the embodiment illustrated in FIG. 5, a pair of platens 59 and 60 which have the tape-bearing reel 52 disposed therebetween, supply the heat necessary for the copy or duplication process. To this effect, heating elements 61 and 62 in the platens 59 and 60 are electrically energized from a power supply 63 and controlled by a thermostat 64. To prevent undesirable magnetic interference, the elements 61 and 62 may be bifilarly wound. A housing 65 of insulating material with a removable lid 66 defines a cavity 67 for confining the assembly comprising the reel 52 and platens 59 and 60, and for thus confining the heating process. Unwinding of the tapes during this process should, of course, be avoided, and a removable tie band (not shown) may be strapped around the tape coil for this purpose.

The platens 59 and 60 are operated to heat the magnetic particles of the copy tape 34 to a temperature, such as $T_2$, which is above $T_C$. Heating is then interrupted, such as by opening a switch 69. The cowound tapes are then permitted to cool. Cooling may be accelerated by removing the lid 66, for instance. During cooling below $T_C$, a thermal remanent magnetization takes place in the particles of the copy tape 34 due to the presence of the magnetically recorded information on the master tape 30. A faithful high-quality copy is thus produced on the copy tape 34. Instead of heating platens, another heat source, such as an infrared lamp (not shown), disposed to irradiate the reel 52 and the tapes coiled thereon, may be employed. Radiofrequency heating may also be employed to the advantage previously indicated.

The method and apparatus of FIG. 5 have the advantage that the copy process as such can proceed in a static fashion without the use of rotating machinery at that stage. Also, since no pulling of heated tapes is necessary, tapes processed according to FIG. 5 can be expected to withstand higher temperatures than if manipulated by moving machinery.

Figure 6:
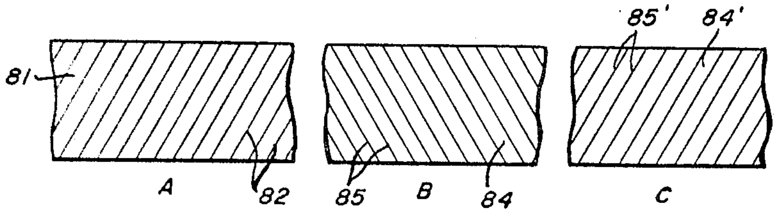
FIG. 6*a*, *b* and *c* schematically show three tape lengths in order to exemplify tape duplication methods according to the invention.

A particularly attractive, though by no means limiting, feature of the tape copying methods herein disclosed is exemplified by FIG. 6. For this purpose, FIG. 6*a* qualitatively illustrates a magnetic recording tape 81 which has information recorded thereon in a slant-track pattern 82. This mode of recording as well as its refinements and machinery is well known (see, for instance, Bernstein, *Video Tape Recording* (Rider 1960), pp. 94—109 and *passim.*), as is its companion, transverse-scan recording. While these recording modes are at present the only feasible approach to the recording of video signals and similar information extending into the Mega-Hertz range, they do have the drawback that they considerably complicate tape duplication or copying processes. Reasons for this disadvantage include the fact that video tape recording processes utilize the bandwidth of the recording process to such an extent that the tape speed during copying has to be practically the same as during recording. Also, conventional video signal copying apparatus are very complex and expensive.

The subject invention also overcomes this disadvantage. According to one embodiment thereof, the tape 81 of FIG. 6*a* corresponds to the previously described tape 30 and is used as the master tape. A tape 84, corresponding in purpose and structure to the copy tape 34 described above, is illustrated in FIG. 6*b*. Both the tapes 81 and 84 are processed together in the manner described in connection with FIG. 4 or FIG. 5, so as to produce on the tape 84 a copy 85 of the information recorded on the master tape 81.

In comparing FIGS. 6*a* and *b*, it will be noted that this results in a record which is a mirror image of the master. While this may not give rise to problems in some linear-track recordings, the subject invention provides methods to overcome possible problems brought about by special kinds of tracking patterns.

According to one of these methods, the matter is recorded so that the recording track pattern 82, indicated in FIG. 6*a*, presents a mirror image of that recording pattern which is to be produced on the copy tape 84, FIG. 6*b*, for playback with conventional type of magnetic playback equipment capable of following the track pattern 85. The copying process thus produces an unreversed recording track pattern 85 from the mirror-image master pattern 82.

An alternative method may be employed if a playback machine is available that is capable of reproducing information that is recorded in a mirror-image track pattern. In this case, the master track pattern may be recorded in an unreversed fashion, whereupon a track pattern will result on the copy tape. To elucidate this principle, the tape 84 shown in FIG. 6*b* with a track pattern 85 is for the moment considered as the master tape, while the tape 84' shown in FIG. 6*c* with a track pattern 85' may be viewed as the copy tape.

A further alternative method may also be understood with reference to FIGS. 6*a—c*. The tape 81 is now defined as a master tape on which information is recorded in an unreversed track pattern 82. Further, the tape 84 in FIG. 6*b* is now defined as a copy tape on which information is copied by one of the methods shown in FIGS. 4 and 5 in a copy track pattern 85, that is a mirror image of the master pattern 82. To produce an unreversed copy track pattern, the copying process is repeated with the copy tape 84 serving as a new or intermediate master. As shown on the tape 84' illustrated in FIG. 6*c*, a second copy can thus be obtained on which the recording track pattern 85' presents an unreversed image of the recording track pattern 82 on the original master tape 81 shown in FIG. 6*a*.

For a successful operation of the latter method, the Curie temperatures of the recording media of the mister tape 81, of the first copy tape 84, and of the second copy tape 84' are correlated as follows:

$$T_{C_1} > T_{C_2}$$
$$T_{C_2} > T_{C_3}$$

whereby $T_{C_1}$ is the Curie temperature of the master tape recording medium, $T_{C_2}$ is that of the first copy tape recording medium, and $T_{C_3}$ is that of the second copy tape recording medium. More exactly, $T_{C_1}$ is chosen so that the magnetic record on master tape 81 is preserved during the heating of the first copy tape 84 to above $T_{C_2}$, but sufficiently below $T_{C_1}$; and that the magnetic record on the first copy tape 84 is preserved during the heating of the second copy tape 84' to above $T_{C_3}$, but sufficiently below $T_{C_2}$.

The above-mentioned features of the invention disclosed in the parent application relating to thermal remanent magnetization and remanent curve acuity within a narrow temperature range permit the production of high-quality copies in the manner just discussed.

Apparatus and methods for exploiting the features illustrated in FIG. 6 are shown in FIGS. 7 to 10.

Figure 7:
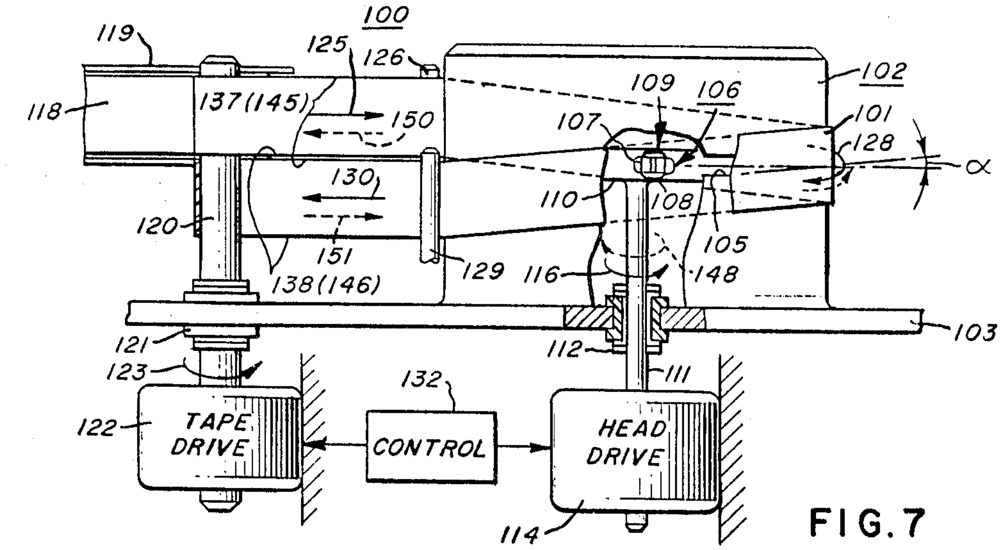
FIG. 7 is an elevation, partially in section, of essential parts of a video tape recorder.

The apparatus 100 illustrated in FIG. 7 serves to record information, such as signals representing a video program or performance, on a tape 101. To this end, the apparatus has a cylindrical drum body 102 mounted on a baseplate 103. The drum body 102 may be of a conventional type now used in video tape recording and playback means, and a peripheral groove 105 is shown to indicate symbolically the rotational plane of operation of a recording head 106 which has a gapped core 107 and a winding 108. Leads 109 are connected to that winding and constitute a means for supplying information signals to this winding for their recording on the tape 101 by the recording head. As is well known in the art, these supply means customarily include also rotational signal transmission means, such as a slip ring or rotating transformer arrangement (not shown).

The recording head 106 is mounted on a rotational disc 110 which, in turn, is mounted on and driven by a shaft 111 which extends here through a bearing 112 in the baseplate 103 and is rotated by a drive or motor 114 in the direction of arrow 116.

The tape 101 is unwound from a supply 118 on a reel 119 by a capstan 120 which extends through a bearing 121 in baseplate 103 and is rotated by a drive or motor 122 in the direction of arrow 123. The tape thereupon moves in the direction of arrow 125 to the drum body 126. A guide roller or pin 126 holds the tape 101 against the periphery of the drum body 102.

An arrow 128 indicated how the tape 101 travels around the drum body 102 to be further guided by a roller or pin 129 located in the vicinity of the pin 126. The tape is thereupon transported in the direction of arrow 130 by the capstan 120 and is taken up by a reel (not shown) which is similar to the reel 119.

It will be noted that the tape 101, while on the drum body 102, moves or is transported at an angle $\alpha$ to the plane of rotation of the recording head 106. This is made possible by the illustrated arrangement of the guide pins 126 and 129 and the manner in which the tape is driven by the capstan 120. For the purpose of clarity of illustration, brackets for mounting the guide pins 126 and 129 have not been shown. Examples of these, as well as of other guide means for assuring or facilitating the illustrated travel of the tape, are shown in existing literature on the type of recording apparatus herein shown.

A control 132 correlates the operation of the drives 114 and 122 so that the shaft 111 and the capstan 120 are rotated in the direction of arrows 116 and 123, respectively, with the rate of rotation of the shaft 111 being higher than that of the capstan 120. In practice, the control 132 may assume the form of one of those many well-known means for controlling or determining the sense of rotation of electric motors. If for a given application a reversal of operation is not required, the control 132 may manifest itself in those components that impose on the drives 114 and 122 a predetermined sense of rotation. Generally, the control 132 may also include a mechanical or electrical coupling between drives 114 and 122. These and other well-known synchronization means are conventional and thus not in detail shown herein.

Figure 8:
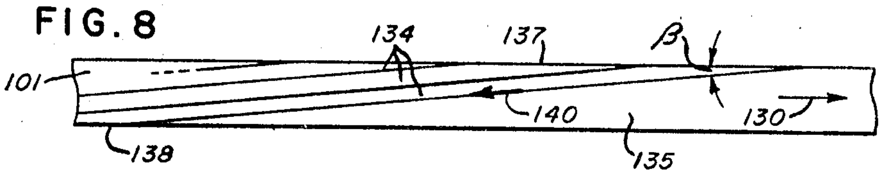
FIG. 8 is a plan view of a length of tape having tracks recorded thereon by the recorder of FIG. 7.

With the senses of rotation so far described, the recording head 106 records the information received through leads 109 along spaced parallel tracks 134 on the tape 101 (one track for each revolution of the head if only one head is used). As schematically shown in FIG. 8, these tracks 134, as seen from a top surface 135, which is here the top surface of the recording layer of the tape 101, extend from a first longitudinal edge 137 to a second longitudinal edge 138 of the tape, with the information record proceeding in a sense of direction indicated by arrow 140. Each track 134 extends at an angle $\beta$ to the upper edge 137 of the tape 135. The angle $\beta$ corresponds in magnitude approximately to the angle $\alpha$ indicated in FIG. 7, the linear motion of the tape altering it slightly. It will, of course, be understood in this connection that the tracks 134 need not necessarily extend exactly from the edge 137 to the edge 138. It is, for instance, well known that edge regions of recording tape are sometimes used for establishing a record of an audio or of an auxiliary signal accompanying the signals recorded on slant or transverse tracks. The tracks 134 may thus extend from what may be called the vicinity of the edge 137 to the vicinity of the edge 138. This is also assumed as being understood with respect to the other slant or transverse track tape recordings shown or mentioned herein.

Figure 9:
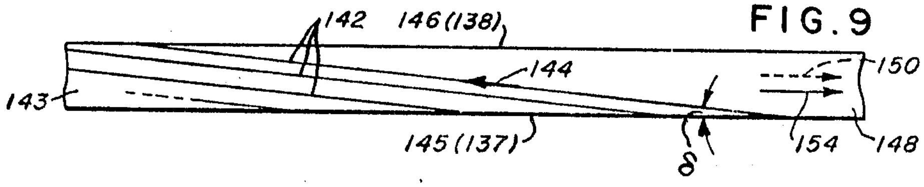
FIG. 9 is a plan view of a length of tape onto which the tracks shown in FIG. 8 have been copied.

If the information recorded on tape 101 is copied in a manner as outlined above, such as by one of the apparatus shown in FIGS. 4 and 5, the information tracks 134 on the master tape 101 appear as, or have their counterpart in, tracks 142 on the copy tape 143, and the copied information record proceeds in the sense of direction indicated by arrow 144, as shown in FIG. 9. The copy tracks 142 now extend from a first longitudinal edge 145 to a second longitudinal edge 146 of the copy tape 143. As seen from a top surface 148 of the copy tape 143, which is here the top surface of the recording layer of that tape, the track angle $\beta$ shown on the master tape 101 has a corresponding angle $\delta$ on the copy tape 143. The latter angle is a mirror image of the former angle, as is the copy track pattern 142 as compared to the master track pattern 134. The longitudinal edges 145 and 146 of the copy tape 143 can then be considered as corresponding respectively to the longitudinal edges 137 and 138 of the master tape 101.

If one considers this fact in connection with the senses of direction indicated by arrows 140 and 144, it becomes clear that a playback of the information copied on tape 143 has to proceed judiciously, lest the information be played back in reverse, at least as from track to track, or lest the playback head intersect the individual tracks rather than following them.

In short, a systematization including a modification of the relative head and tape movements from what established convention would dictate is necessary.

For instance, if one were to reverse the head rotation (see dotted arrow 148) and the direction of tape transport (see dotted arrows 150 and 151), the head 106, when operating as a playback head on a copy tape, would scan in the correct general direction (note arrow 144, FIG. 9), but would proceed from the tape edge 146 to the edge 145, instead of following the tracks 142 (see FIG. 9) from the edge 145 to the edge 146.

Figure 10:
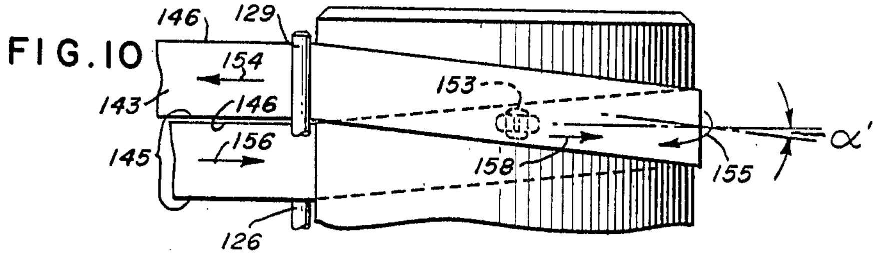
FIG. 10 is an elevation of part of the recorder of FIG. 7 and illustrates a modification of that recorder according to the subject invention.

One preferred method and apparatus for solving this problem according to the subject invention is illustrated in FIG. 10 where like reference numerals as among FIGS. 7 and 10 designate like parts, and where those parts that can be conveniently seen from FIG. 7 are not again illustrated.

In the apparatus of FIG. 10 the copy tape 143 to be played back by means of a rotating playback head 153, which may be structurally identical or similar to the head 106 shown in FIG. 7, is transported in the direction of the arrows 154, 155 and 156 at an angle $\alpha'$ which is a mirror image of the angle $\alpha$ shown in FIG. 7 as seen from the planes of rotation of heads 106 and 153. The means for enabling this angular reversal include the guide pins 126 and 129 which are mounted in positions reversed from those illustrated in FIG. 7.

The head 153 is driven to rotate in the direction of arrow 158 to be now capable of scanning the copy tape 143 from the edge 145 to the edge 146, track for track. The invention thus solves an intricate and vexing problem in a simple and convenient manner.

While the copying methods disclosed herein are preferred, it will be recognized that the method and apparatus shown in FIGS. 7 and 10 also lend themselves to use with other tape-to-tape copying procedures.

While many advanced features, methods and apparatus are disclosed herein in a specific manner, those skilled in the art will recognize that various modifications and extensions of the underlying principles are possible within the scope and spirit of the invention.

I claim:

1. In a method of producing, for subsequent copying onto a copy tape by a tape-to-tape copying process, a slant-track or transverse-scan master record of information on a master recording tape having parallel longitudinal edges, by the use of recording means adapted to be operatively coupled with said master recording tape for recording said information thereon, the improvement of:

a. advancing said master recording tape;

b. moving said recording means relatively to said advancing master recording tape along first recording tracks extending on said master recording tape with respect to said longitudinal edges at angles which are mirror images of angles of corresponding second recording tracks required on said copy tape under a predetermined convention for a playback of said information from said copy tape; and c. recording with said recording means said information in said first recording tracks during said movement of said recording means along said first recording tracks.

2. A method as claimed in claim 1, wherein said movement of said recording means relative to said master recording tape includes:

a. moving said recording means substantially in a predetermined plane; and b. transporting said master recording tape at an angle which, as seen from a predetermined reference point, is a mirror image of an angle required under a predetermined convention for a playback of said information from said copy tape.

3. In a method of recording information on a master recording tape, producing on a copy tape a copy of said information, and playing back said copied information from said copy tape, the improvement comprising in combination:

a. relatively moving information recording means and said master recording tape along first recording tracks extending on said master recording tape at predetermined first angles to a direction of movement of said master recording tape, and recording with said information recording means said information in said first recording tracks during said relative movement of said information recording means and said master recording tape;

b. producing on said copy tape, by a tape-to-tape copying process, a copy of said recorded information in the form of an information record contained in second recording tracks extending at second angles which are mirror images of said first angles; and c. relatively moving information playback means and said copy tape along said second recording tracks and playing back with said information playback means the information from said copy on said copy tape during said relative movement of said information playback means and said copy tape.

4. In a method of recording information on a master recording tape having a first top surface and first parallel longitudinal edges, producing on a copy tape having a second top surface and second parallel longitudinal edges a copy of said information, and playing back said copied information from said copy tape, the improvement comprising in combination:

a. relatively moving information recording means and said master recording tape along first recording tracks individually extending on said master recording tape, as seen from said first top surface, from at least the vicinity of one of said first longitudinal edges to at least the vicinity of the other of said first longitudinal edges, and at predetermined first angles relative to said first longitudinal edges, and recording with said information recording means said information in said first recording tracks during said relative movement of said information recording means and said master recording tape;

b. producing on said copy tape, by a tape-to-tape copying process, a copy of said recorded information in the form of an information record contained in second recording tracks individually extending, as seen from said second top surface, from at least the vicinity of one of said second longitudinal edges corresponding to said one of said first longitudinal edges, to at least the vicinity of the other of said second longitudinal edges corresponding to said other of said first longitudinal edges, and at second angles which are mirror images of said first angles; and c. relatively moving information playback means and said copy tape along said second recording tracks and playing back with said information playback means the information from said copy on said copy tape during said relative movement of said information playback means and said copy tape.

5. In a method of recording information on a master recording tape with the aid of recording head means, producing on a copy tape a copy of the recorded information, and playing back said copy of the recorded information from said copy tape with the aid of playback head means, the improvement comprising in combination:

a. rotating said recording head means in a predetermined plane;

b. transporting said master recording tape by way of said predetermined plane at a first angle relative to said plane and recording said information in a slant-track pattern on said master recording tape with said recording head means;

c. producing on said copy tape and with a one-step tape-to-tape copying process a mirror-image copy of said slant-track pattern including a copy of said information;

d. rotating said playback head means in a predetermined plane; and e. transporting said copy tape by way of said plane of rotation of said playback head means at a second angle relative to said plane of rotation of said playback head means, with said first and second angles being mirror images of each other, and playing back with said playback head means said copy of the information from said mirror-image copy of the slant-track pattern on the copy tape.